(12) United States Patent
Bai

(10) Patent No.: US 11,820,233 B2
(45) Date of Patent: Nov. 21, 2023

(54) PLUG-IN HYBRID POWERTRAIN FOR AUTOMOTIVE VEHICLES

(71) Applicant: Shushan Bai, Ann Arbor, MI (US)

(72) Inventor: Shushan Bai, Ann Arbor, MI (US)

( * ) Notice: Subject to any disclaimer, the term of this patent is extended or adjusted under 35 U.S.C. 154(b) by 0 days.

(21) Appl. No.: 17/891,210

(22) Filed: Aug. 19, 2022

(65) Prior Publication Data

US 2023/0076997 A1   Mar. 9, 2023

Related U.S. Application Data

(60) Provisional application No. 63/241,643, filed on Sep. 8, 2021.

(51) Int. Cl.
| | |
|---|---|
| *B60K 6/38* | (2007.10) |
| *B60K 6/365* | (2007.10) |
| *B60K 6/547* | (2007.10) |
| *B60K 6/387* | (2007.10) |

(52) U.S. Cl.
CPC .......... *B60K 6/365* (2013.01); *B60K 6/387* (2013.01); *B60K 6/547* (2013.01); *B60Y 2200/92* (2013.01); *F16H 2200/006* (2013.01); *F16H 2200/0073* (2013.01); *F16H 2200/0078* (2013.01); *F16H 2200/201* (2013.01); *F16H 2200/2007* (2013.01); *F16H 2200/2012* (2013.01); *F16H 2200/2043* (2013.01)

(58) Field of Classification Search
CPC ........ B60K 6/365; B60K 6/387; B60K 6/547; F16H 2200/006; F16H 2200/0073; F16H 2200/0078; F16H 2200/2007; F16H 2200/201; F16H 2200/2012; F16H 2200/2043; F16H 2200/0056; B60Y 2200/92; Y02T 10/62

See application file for complete search history.

(56) References Cited

U.S. PATENT DOCUMENTS

| | | | |
|---|---|---|---|
| 2007/0225097 A1* | 9/2007 | Raghavan | B60K 6/445 475/5 |
| 2016/0023648 A1* | 1/2016 | Yamamoto | F16H 3/66 180/65.265 |
| 2016/0107635 A1* | 4/2016 | Kodawara | B60L 7/14 180/65.265 |
| 2019/0039622 A1* | 2/2019 | Kumazaki | B60W 50/0098 |
| 2020/0182333 A1* | 6/2020 | Mellet | B60K 6/547 |

* cited by examiner

*Primary Examiner* — Jacob S. Scott
*Assistant Examiner* — Farhana Pervin

(57) ABSTRACT

A plug-in hybrid powertrain for automotive vehicle is provided which has an internal combustion engine; an electric machine; multiple planetary gear sets, multiple selectively engageable clutch mechanisms and an output member. Selectively engaging those clutches will achieve multiple operation modes including multiple torque transfer ratio from electric machine to output member; multiple torque transfer ratio from internal combustion engine to output member; electric machine propulsion mode; internal combustion engine propulsion mode; generator assistant vehicle launch modes for forward and reverse in the internal combustion engine vehicle launch operations; motor assistant propulsion when in internal combustion engine vehicle propulsion operations; and engine cranking mode. The plug-in hybrid powertrain achieves more torque transfer ratios and operational mode with given number of planetary gear sets and clutches then any existing system.

1 Claim, 20 Drawing Sheets

| Operation modes | | C0 | C1 | C2 | C3 | B1 | B2 |
|---|---|---|---|---|---|---|---|
| Electric machine propulsion | EM-1 | | ON | | | ON | |
| | EM-2 | | ON | | | | ON |
| | EM-3 | | | ON | | | ON |
| | EM-4 | | ON | ON | | | |
| Internal combustion engine propulsion with electric machine assistant as needed | ICE-FL (GA-launch) | ON | | | | ON | |
| | ICE-1 | ON | | | ON | ON | |
| | ICE-2 (MA) | ON | | | ON | | ON |
| | ICE-3 (MA) | ON | | ON | ON | | |
| | ICE-4 (MA) | ON | | ON | | | ON |
| | ICE-R | ON | ON | | | ON | |
| | ICE CRANING | | | | | | |
| MA: motor assistant; GA: generator assistant | | | | | | | |
| FL: forward launch; RL: reverse launch | | | | | | | |

*Figure - 17*

| Operation modes | | C0 | C1 | C2 | C3 | B1 | B2 |
|---|---|---|---|---|---|---|---|
| Electric machine propulsion | EM-1 | | | ON | ON | | ON |
| | EM-2 | | ON | | ON | | ON |
| | EM-3 | | ON | ON | | | ON |
| | EM-4 | | ON | ON | ON | | |
| Internal combustion engine propulsion with electric machine assistant as needed | ICE-FL (GA-launch) | ON | | | ON | | ON |
| | ICE 1 | ON | | | ON | ON | ON |
| | ICE-2 (MA) | ON | ON | | ON | | ON |
| | ICE-3 (MA) | ON | | ON | ON | | ON |
| | ICE-4 (MA) | ON | ON | ON | | | ON |
| | ICE-5 (MA) | ON | ON | ON | ON | | |
| | ICE-6 | ON | ON | ON | | ON | |
| | ICE-7 | ON | | ON | ON | ON | |
| | ICE-RL (GA-launch) | ON | ON | | | | ON |
| | ICE-R | ON | ON | | | ON | ON |
| | ICE CRANING | ON | | ON | | | ON |
| MA: motor assistant; GA: generator assistant | | | | | | | |
| FL: forward launch; RL: reverse launch | | | | | | | |

*Figure - 18*

| Operation modes | | C0 | C1 | C2 | C3 | B1 | B2 |
|---|---|---|---|---|---|---|---|
| Electric machine propulsion | EM-1 | | ON | | ON | | ON |
| | EM-2 | | | ON | ON | | ON |
| | EM-3 | | ON | ON | | | ON |
| | EM-4 | | ON | ON | ON | | |
| Internal combustion engine propulsion with electric machine assistant as needed | ICE-FL (GA-launch) | ON | | ON | | | ON |
| | ICE 1 | ON | | ON | | ON | ON |
| | ICE-2 (MA) | ON | ON | | ON | | ON |
| | ICE-3 (MA) | ON | ON | ON | | | ON |
| | ICE-4 (MA) | ON | | ON | ON | | ON |
| | ICE-5 (MA) | ON | ON | | | ON | ON |
| | ICE-6 | ON | ON | ON | ON | | |
| | ICE-7 | ON | | ON | ON | ON | |
| | ICE-8 | ON | ON | | ON | ON | |
| | ICE-9 | ON | ON | ON | | ON | |
| | ICE-RL (GA-launch) | ON | | | ON | | ON |
| | ICE-R | ON | | | ON | ON | ON |
| | ICE CRANING | ON | | ON | | | ON |

MA: motor assistant; GA: generator assistant
FL: forward launch; RL: reverse launch

*Figure - 19*

| Operation modes | | C0 | C1 | C2 | C3 | B1 | B2 |
|---|---|---|---|---|---|---|---|
| Electric machine propulsion modes | EM-1 | | | ON | ON | | ON |
| | EM-2 | | ON | ON | | | ON |
| | EM-3 | | ON | | ON | | ON |
| | EM-4 | | ON | ON | ON | | |
| Internal combustion engine propulsion modes with electric machine assistant as needed | ICE-FL (GA-launch) | ON | ON | | | | ON |
| | ICE 1 | ON | ON | | | ON | ON |
| | ICE-2 (MA) | ON | | | ON | ON | ON |
| | ICE-3 (MA) | ON | ON | | ON | | ON |
| | ICE-4 (MA) | ON | | ON | ON | | ON |
| | ICE-5 (MA) | ON | ON | ON | | | ON |
| | ICE-6 | ON | ON | ON | ON | | |
| | ICE-7 | ON | ON | ON | | ON | |
| | ICE-8 | ON | | ON | ON | ON | |
| | ICE-9 | ON | ON | | ON | ON | |
| | ICE-RL (GA-launch) | ON | | ON | | | ON |
| | ICE-R | ON | | ON | | ON | ON |
| | ICE CRANING | ON | ON | | | | ON |
| MA: motor assistant; GA: generator assistant FL: forward launch; RL: reverse launch | | | | | | | |

*Figure - 20*

PLUG-IN HYBRID POWERTRAIN FOR AUTOMOTIVE VEHICLES

RELATED APPLICATION this is the non-provisional patent application of the provisional patent application with application Number of 63/241,643 and title of Plug-in Hybrid Powertrain for Automotive Vehicles.

FIELD OF THE INVENTION

This invention relates to a plug-in hybrid powertrain for automotive vehicles.

BACKGROUND

Typical plug-in hybrid powertrains have an internal combustion engine which converts fuel to propulsion power, and one or two electrical machines (motor/generator) which converts electricity stored in a rechargeable battery to propulsion power. The propulsion powers from those power sources are delivered to vehicle axle through a power transfer system. The power transfer system has an output member which usually connects to vehicle axle through a final drive unit. The designs of such power transfer system determine the features, performance, compactness, and cost of the plug-in hybrid powertrain.

To minimize the cost of the system, this invention aimed at the plug-in hybrid powertrain with just one electrical machine along with one internal combustion engine, specifically aimed at the design of the power transfer system for so called single electrical machine plug-in hybrid powertrain. Such power transfer systems usually consist of multiple planetary gear sets and multiple selectively engageable clutches. Selectively engaging those clutches will achieve multiple operation modes including multiple torque transfer ratio from electric machine to output member; multiple torque transfer ratio from internal combustion engine to output member; electric machine propulsion mode; internal combustion engine propulsion mode; generator assistant launch modes for forward and reverse in internal combustion engine vehicle launch operations; motor assistant propulsion when in internal combustion engine vehicle propulsion operations; and engine cranking mode. One important aim of this invention is to achieve more torque transfer ratios and operation modes with given contents (given number of planetary gear sets and given number of clutches).

The desired features of a well-designed power transfer systems for the plug-in hybrid powertrains are list as the following.
1. Have suitable multiple mechanical torque transfer ratios from the electric machine to the output element for electrical machine propulsion operations.
2. Have suitable multiple mechanical torque transfer ratios from the internal combustion engine to the output element for internal combustion engine propulsion operations.
3. Have generator assistant (GA) vehicle launch modes for both forward and reverse for launching the vehicle with internal combustion power only. This will eliminate the traditional vehicle launch means such as torque converter or frictional launch clutch. That is the internal combustion engine vehicle launch operations do not use the traditional vehicle launch means such as torque converter or frictional launch clutch, instead use the electrical machine in generation mode to launch the vehicle, namely generator assistant (GA) launch. Therefore, do not consume electrical energy.
4. Can propel the vehicle with summation of internal combustion engine power and electric machine power. Especially when in internal combustion engine propulsion operation mode, the electric machine can add power to the propulsion, namely motor assistant (MA) propulsion.
5. Can switch between electric machine drive and internal combustion engine drive smoothly.
6. Can do regenerative vehicle braking.
7. Can recharge battery with internal combustion engine.

Various single electric machine plug-in hybrid powertrain systems have been proposed. However, none of them provides all features listed above. Some of them do not have all suitable mechanical transfer ratios for both internal combustion engine and electric machine. Some of them rely on the traditional vehicle launch mythology such as torque converter or frictional launch clutch in internal combustion engine vehicle launch operations. The aim of this invention is at power transfer systems for single electric motor plug-in hybrid powertrain, which has all above listed features, and is realized with simplest design, or could be stated as achieve more torque transfer ratios and operation modes with given number of planetary gear sets and given number of clutches.

BRIEF SUMMARY OF THE INVENTION

To better describe the invention, some basic terms are defined here first.
1. As well known by the industry, a planetary gear set (also called differential gear set) is a gear system which has three interrelated rotating elements. Those elements are ring gear, planetary gear carrier and sun gear, and will be called the first element, second element and third element in the following descriptions.
2. The team 'fixed connection' between two elements means a mechanical connection between the two elements which couples two elements as one rotating body therefore always rotate at same speed.
3. The team 'clutch connection' between two elements means a selectively engageable clutch is deployed between the two elements such that, when the clutch is engaged the two elements are connected into one rotating body therefore always rotate at same speed, when the clutch is disengaged the two elements are disconnected therefore will rotate freely from each other.
4. The term 'ground' means the case of the power transfer system, therefore is a stationary element.

The invented power transfer systems for single electric machine plug-in hybrid powertrains consists of multiple planetary gear sets, multiple selectively engageable clutches and provide all operational features described in the paragraph [04] The invented power transfer systems are constructed based on the claimed connection configuration principles, and therefore achieved a greater number of torque transfer ratios and operation modes with given number of planetary gear sets and given number of clutches.

For the embodiments with two planetary gear sets, five clutches (do not include the engine disconnect clutch which is named C0 in the following embodiment descriptions) are deployed between elements of planetary gear sets, internal combustion engine, electrical machine, ground, and output element based on the claimed connection configuration principles. Those embodiments with two planetary gear sets and five clutches achieved four torque transfer ratios from internal combustion engine to output member, four torque transfer ratio from electric machine to output member, generator assistant launch modes for forward in vehicle launch operations and engine cranking mode. Therefore, it achieves all operational features described in the paragraph [04]

For the embodiments with three planetary gear sets, five clutches (do not include the engine disconnect clutch which is named C0 in the following embodiment descriptions) are deployed between elements of planetary gear sets, internal combustion engine, electrical machine, ground, and output element based on the claimed connection configuration principles. Those embodiments with three planetary gear sets and five clutches achieved seven torque transfer ratios from internal combustion engine to output member, four torque transfer ratio from electric machine to output member, generator assistant launch modes for forward and reverse in vehicle launch operations and engine cranking mode. Therefore, it achieves all operational features described in the paragraph [04] Note, the existing planetary gear automatic transmissions with same three planetary gear sets and five clutches only achieve six torque transfer ratios from internal combustion engine to output member.

For the embodiments with four planetary gear sets, five clutches (do not include the engine disconnect clutch which is named C0 in the following embodiment descriptions) are deployed between elements of planetary gear sets, internal combustion engine, electrical machine, ground, and output element based on the claimed connection configuration principles. Those embodiments with four planetary gear sets and five clutches achieved nine torque transfer ratios from internal combustion engine to output member, four torque transfer ratio from electric machine to output member, generator assistant launch modes for forward and reverse in vehicle launch operations and engine cranking mode. Therefore, it achieves all operational features described in the paragraph [04] Note, the existing planetary gear automatic transmissions with same four planetary gear sets and five clutches only achieve eight torque transfer ratios from internal combustion engine to output member.

BRIEF DESCRIPTION OF THE DRAWINGS

FIG. 17 is a table of clutch states of embodiments of the invented plug-in hybrid powertrain system with two planetary gear sets.

FIG. 18 is a table of clutch states of embodiments of the invented plug-in hybrid powertrain system with three planetary gear sets.

FIG. 19 is a table of clutch states of embodiments of the invented plug-in hybrid powertrain system with four planetary gear sets.

FIG. 20 is a table of clutch states of embodiments of the invented plug-in hybrid powertrain system with four planetary gear sets.

DETAILED DESCRIPTION OF THE INVENTION

Figure 1:
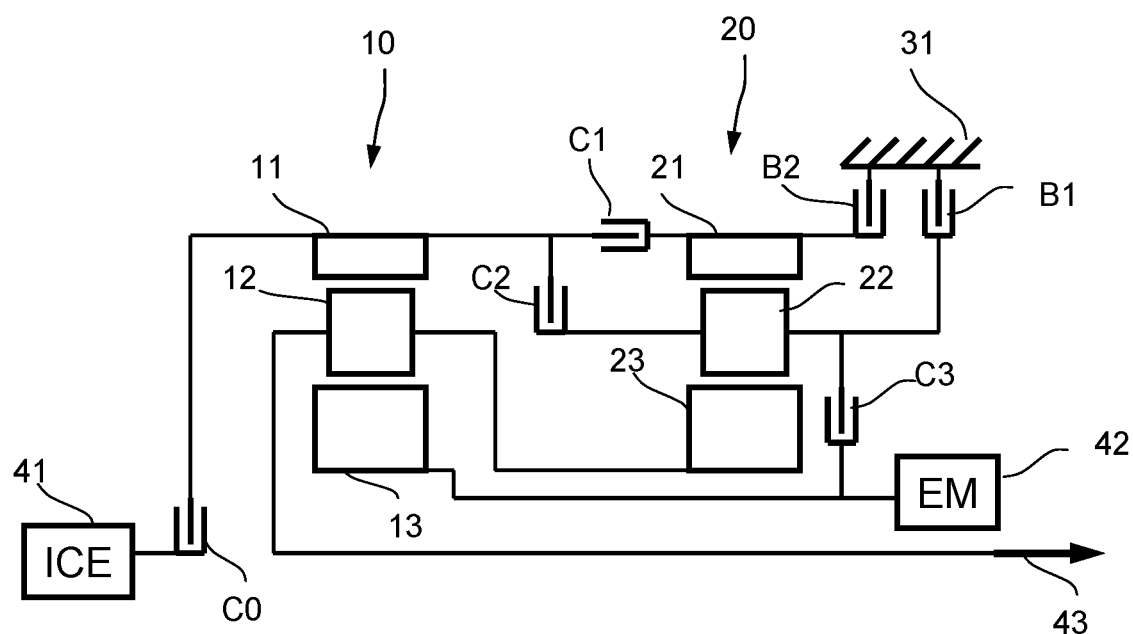
FIG. 1 is a schematic diagram of a first embodiment of the invented plug-in hybrid powertrain system with two planetary gear sets.

Referring to the Figures, wherein like reference numbers refer to like components throughout the several views. FIG. 1 shows a first embodiment of the plug-in hybrid powertrain system which includes an internal combustion engine 41, an electric machine 42 and an output shaft 43. The power transfer system of this plug-in hybrid powertrain system consists of two simple planetary gear sets 10 and 20. The planetary gear set 10 has three interrelated rotation elements labeled 11, 12 and 13, and the planetary gear set 20 has three interrelated rotation elements labeled 21, 22 and 23. Fixed connections between element 12 and element 23 and output shaft 43 make them as one rotating body. The clutch C1 establishes a clutch connection between the element 11 and element 21. The clutch C2 establishes a clutch connection between element 11 and element 22. The clutch C3 establishes a clutch connection between element 13 and element 22. The clutch B1 establishes a clutch connection between element 22 and ground 31. The clutch B2 establishes a clutch connection between element 21 and ground 31. The clutch C0 establishes a clutch connection between element 11 and the internal combustion engine 41. The electric machine 42 is coupled with element 13.

The plug-in hybrid powertrain system shown in FIG. 1 can achieve multiple operation modes by selectively engage clutches. The engagement states of the clutches C0, C1, C2, C3, B1 and B2 for each operation mode are summarized in the table shown in FIG. 17 and described in the following.

The first group of operation modes is the electric machine only propulsion operation group. It includes multiple transfer ratio modes for electric machine propulsion as:
1. In the first transfer ratio mode of electric machine propulsion operation, the clutch C1 and B1 are engaged, and all other clutches are disengaged. The internal combustion engine 41 is off, and the electric machine 43 provides electric propulsion and regenerative break operation.
2. In the second transfer ratio mode of electric machine propulsion operation, the clutch C2 and B1 are engaged, and all other clutches are disengaged. The internal combustion engine 41 is off, and the electric machine 43 provides electric propulsion and regenerative break operation. The second transfer ratio of electric machine propulsion operation can be also achieved by having clutch C1 and B2 engaged.
3. In the third transfer ratio mode of electric machine propulsion operation, the clutch C2 and B2 are engaged, and all other clutches are disengaged. The internal combustion engine 41 is off, and the electric machine 43 provides electric propulsion and regenerative break operation.
4. In the fourth transfer ratio mode of electric machine propulsion operation, the clutch C1 and C2 are engaged, and all other clutches are disengaged. The internal combustion engine 41 is off, and the electric machine 43 provides electric propulsion and regenerative break operation.

The second group of operation modes is the internal combustion engine propulsion with electric machine power assistant operation group which includes multiple transfer ratio modes for internal combustion engine propulsion as:
1. The first transfer ratio mode of internal combustion engine propulsion operation provides the vehicle launch operation in which the clutch C0 and B1 are engaged, and all other clutches are disengaged. The internal combustion engine provides propulsion power, and the electric machine is in generation mode, therefore no consumption of electricity. Such internal combustion engine vehicle launch operation is called generator assistant (GA) launch.
2. In the second transfer ratio mode of internal combustion engine propulsion operation the clutch C0, C3 and B1 are engaged, and all other clutches are disengaged. In this mode, during the vehicle propulsion operation, the internal combustion engine provides propulsion power, and the electric machine is off. During the vehicle braking operation the electric machine provides regenerative braking. In the regeneration braking operation, the clutch C0 can be disengaged to gain more electricity from regenerative braking.
3. In the third transfer ratio mode of internal combustion engine propulsion operation the clutch C0, C3 and B2 are engaged, and all other clutches are disengaged. In this mode, during the vehicle propulsion operation, the internal combustion engine provides propulsion power, and the electric machine is off. During the vehicle braking operation the electric machine provides regenerative braking. In the regeneration braking operation, the clutch C0 can be disengaged to gain more electricity from regenerative braking.
4. In the fourth transfer ratio mode of internal combustion engine propulsion operation the clutch C0, C3 and C2 are engaged, and all other clutches are disengaged. In this mode, during the vehicle propulsion operation, the internal combustion engine provides propulsion power, and the electric machine is off. During the vehicle braking operation the electric machine provides regenerative braking. In the regeneration braking operation, the clutch C0 can be disengaged to gain more electricity from regenerative braking.
5. In the fifth transfer ratio mode of internal combustion engine propulsion operation the clutch C0, C2 and B2 are engaged, and all other clutches are disengaged. In this mode, during the vehicle propulsion operation, the internal combustion engine provides propulsion power, and the electric machine is off. During the vehicle braking operation the electric machine provides regenerative braking. In the regeneration braking operation, the clutch C0 can be disengaged to gain more electricity from regenerative braking.
6. In the reverse transfer ratio mode of internal combustion engine propulsion operation, the clutch C0, C1 and B1 are engaged, and all other clutches are disengaged. In this mode, during the vehicle propulsion operation, the internal combustion engine provides propulsion power, and the electric machine is off. The vehicle launch in reverse is achieved by slipping control of one of three clutches C0, C1 or B1.
7. In the engine cranking mode of internal combustion engine propulsion operation, the clutch C0 is engaged, and all other clutches are disengaged. In this mode the electric machine provides engine cranking torque to start the internal combustion engine.
8. When in the internal combustion engine propulsion operation modes excepting one in which the electric machine is grounded, the electric machine can provide power assistant to maximized vehicle propulsion power, such operation is called motor assistant (MA) propulsion.

With this plug-in hybrid powertrain, the vehicle could be programmed to have the following three operation methods.

In the first operation method, at low vehicle speed or in city driving the electric machine only propulsion will be used. At high vehicle speed or highway driving the internal combustion engine will be started, and then internal combustion engine propulsion will be used. During the internal combustion engine propulsion, the motor assistant (MA) propulsion could be used. The internal combustion engine can be started by engaging the clutch C0 when in the second transfer ratio or above of electric machine propulsion operation.

In the second operation method, the electric machine only propulsion will be used all the time no matter low or high vehicle speed nor city or highway driving.

The third operation method will be selected if the rechargeable propulsion battery is depleted. In this operation method only internal combustion engine propulsion is used, and the vehicle launch is achieved with generator assistant (GA) method.

The regenerative braking is available in all about three operation methods.

Figure 2:
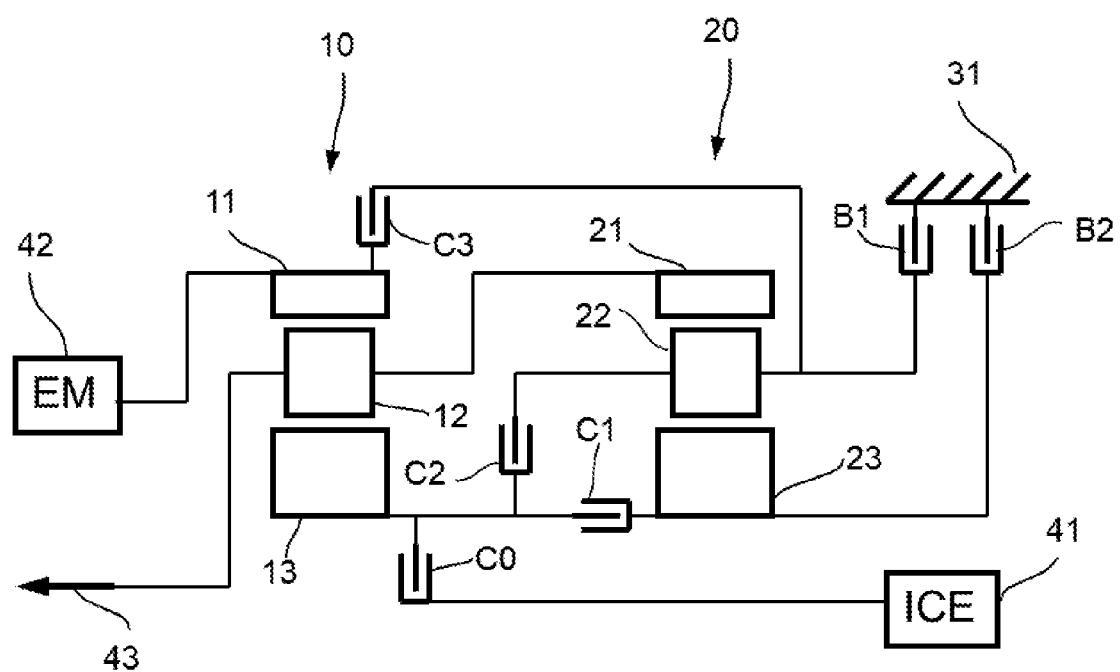
FIG. 2 is a schematic diagram of a second embodiment of the invented plug-in hybrid powertrain system with two planetary gear sets.

FIG. 2 shows a second embodiment of the plug-in hybrid powertrain system which includes an internal combustion engine 41, an electric machine 42 and an output shaft 43. The power transfer system of this plug-in hybrid powertrain system consists of two simple planetary gear sets 10 and 20. The planetary gear set 10 has three interrelated rotation elements labeled 11, 12 and 13, and the planetary gear set 20 has three interrelated rotation elements labeled 21, 22 and 23. Fixed connections between element 12 and element 21 and output shaft 43 make them as one rotating body. The clutch C1 establishes a clutch connection between the element 13 and element 23. The clutch C2 establishes a clutch connection between element 13 and element 22. The clutch C3 establishes a clutch connection between element 11 and element 22. The clutch B1 establishes a clutch connection between element 22 and ground 31. The clutch B2 establishes a clutch connection between element 23 and ground 31. The clutch C0 establishes a clutch connection between element 13 and the internal combustion engine 41. The electric machine 42 is coupled with element 11. The descriptions of operation modes of the second embodiment shown in FIG. 2 and its vehicle operation methods are identical to the first embodiment described above since the same reference numbers refer to alike components. The engagement states of the clutches C0, C1, C2, C3, B1 and B2 for each operation mode are summarized in the table shown in FIG. 17.

Figure 3:
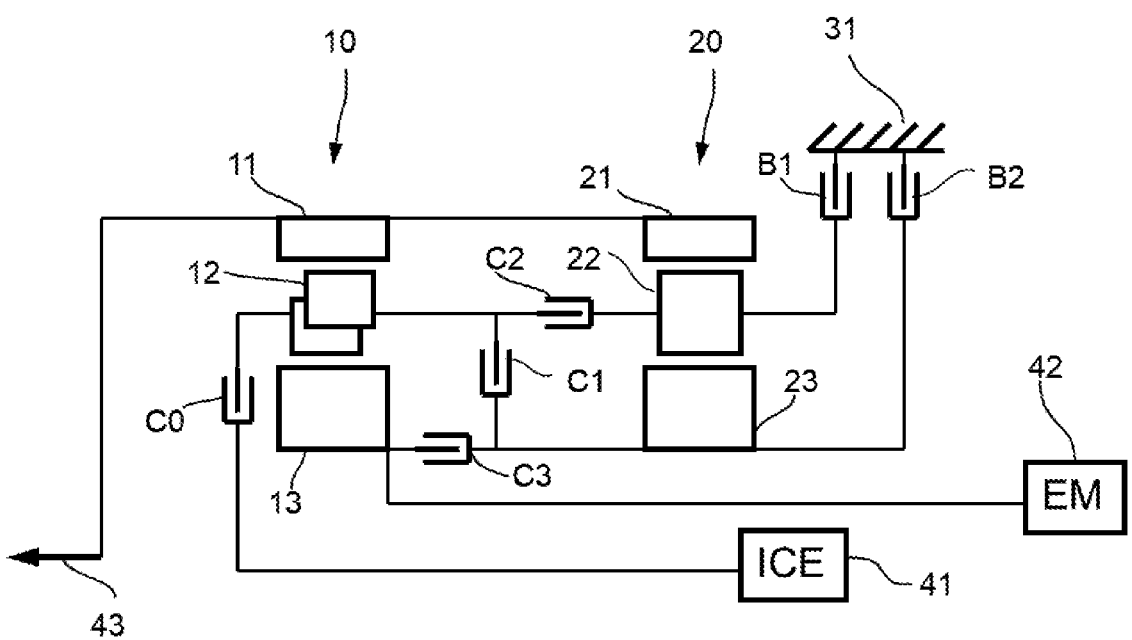
FIG. 3 is a schematic diagram of a third embodiment of the invented plug-in hybrid powertrain system with two planetary gear sets.

FIG. 3 shows a third embodiment of the plug-in hybrid powertrain system which includes an internal combustion engine 41, an electric machine 42 and an output shaft 43. The power transfer system of this plug-in hybrid powertrain system consists of a compound (double-pinion gear) planetary gear set 10 and a simple planetary gear set 20. The compound planetary gear set 10 has three interrelated rotation elements labeled 11, 12 and 13, and the simple planetary gear set 20 has three interrelated rotation elements labeled 21, 22 and 23. Fixed connections between element 11 and element 21 and output shaft 43 make them as one rotating body. The clutch C1 establishes a clutch connection between the element 12 and element 23. The clutch C2 establishes a clutch connection between element 12 and element 22. The clutch C3 establishes a clutch connection between element 13 and element 23. The clutch B1 establishes a clutch connection between element 22 and ground 31. The clutch B2 establishes a clutch connection between element 23 and ground 31. The clutch C0 establishes a clutch connection between element 12 and the internal combustion engine 41. The electric machine 42 is coupled with element 13. The descriptions of operation modes of the third embodiment shown in FIG. 3 and its vehicle operation methods are identical to the first embodiment described above since the same reference numbers refer to alike components. The engagement states of the clutches C0, C1, C2, C3, B1 and B2 for each operation mode are summarized in the table shown in FIG. 17.

Figure 4:
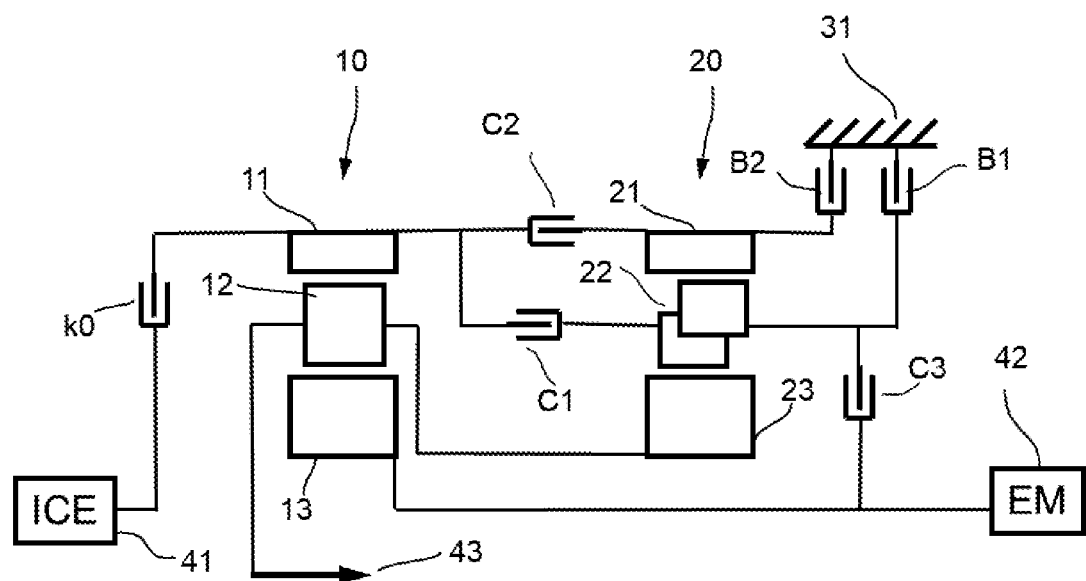
FIG. 4 is a schematic diagram of a fourth embodiment of the invented plug-in hybrid powertrain system with two planetary gear sets.

FIG. 4 shows a fourth embodiment of the plug-in hybrid powertrain system which includes an internal combustion engine 41, an electric machine 42 and an output shaft 43. The power transfer system of this plug-in hybrid powertrain system consists of a compound (double-pinion gear) planetary gear set 20 and a simple planetary gear set 10. The compound planetary gear set 20 has three interrelated rotation elements labeled 21, 22 and 23, and the simple planetary gear set 10 has three interrelated rotation elements labeled 11, 12 and 13. Fixed connections between element 12 and element 23 and output shaft 43 make them as one rotating body. The clutch C1 establishes a clutch connection between the element 11 and element 22. The clutch C2 establishes a clutch connection between element 11 and element 21. The clutch C3 establishes a clutch connection between element 13 and element 22. The clutch B1 establishes a clutch connection between element 22 and ground 31. The clutch B2 establishes a clutch connection between element 21 and ground 31. The clutch C0 establishes a clutch connection between element 11 and the internal combustion engine 41. The electric machine 42 is coupled with element 13. The descriptions of operation modes of the fourth embodiment shown in FIG. 4 and its vehicle operation methods are identical to the first embodiment described above since the same reference numbers refer to alike components. The engagement states of the clutches C0, C1, C2, C3, B1 and B2 for each operation mode are summarized in the table shown in FIG. 17.

Figure 5:
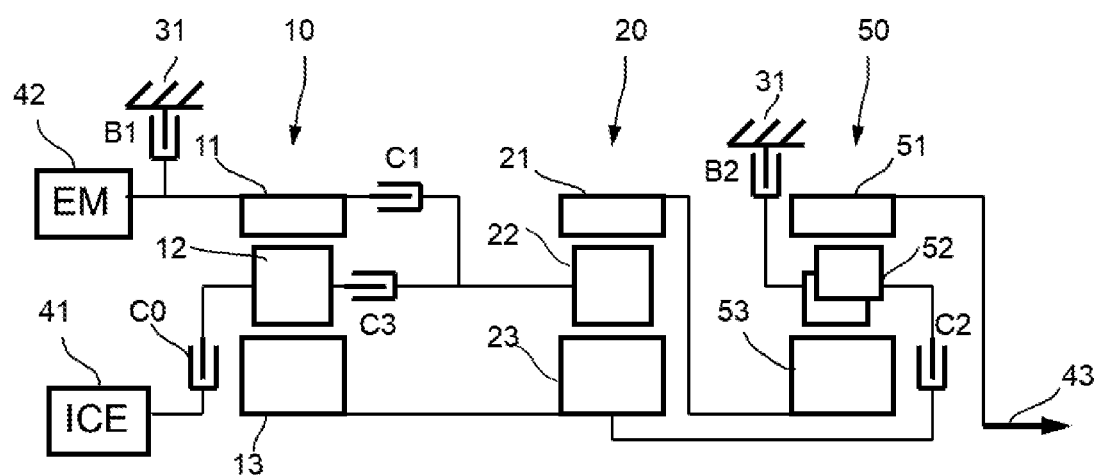
FIG. 5 is a schematic diagram of a fifth embodiment of the invented plug-in hybrid powertrain system with three planetary gear sets.

FIG. 5 shows a fifth embodiment of the plug-in hybrid powertrain system which includes an internal combustion engine 41, an electric machine 42 and an output shaft 43. The power transfer system of this plug-in hybrid powertrain system consists of three planetary gear sets. The first planetary gear set 10 is a simple planetary gear set, and has three elements labeled 11, 12 and 13. The second planetary gear set 20 is a simple planetary gear set, and has three elements labeled 21, 22 and 23. The third planetary gear set 50 is compound (double-pinion gear) planetary gear set, and has three elements labeled 51, 52 and 53. Elements 13 and 23 are connected with a fixed connection, and elements 21 and 53 are connected with another fixed connection, therefore there are total of two fixed connections deployed between neighboring planetary gear sets. The clutch C1 establishes a clutch connection between the element 11 and element 22. The clutch C2 establishes a clutch connection between element 23 and element 52. The clutch C3 establishes a clutch connection between element 12 and element 22. The clutch B1 establishes a clutch connection between element 11 and ground 31. The clutch B2 establishes a clutch connection between element 52 and ground 31. The clutch C0 establishes a clutch connection between element 12 and the internal combustion engine 41. The electric machine 42 is coupled with element 11, therefore the electric machine 42 is coupled with element 11 as well as with the grounding clutch B1 and connection clutch C1. The element 51 is coupled with the output shaft 43. The operation modes and vehicle operation methods of this embodiment are as same as what are described for the first embodiment of FIG. 1, except that this embodiment has more transfer ratio for both electric machine propulsion and internal combustion engine propulsion, and capable to do generator assistant (GA) launch for both forward and reverse. The states of the clutches C0, C1, C2, C3, B1 and B2 for all operation modes of this embodiment are summarized in the table shown in FIG. 18.

Figure 6:
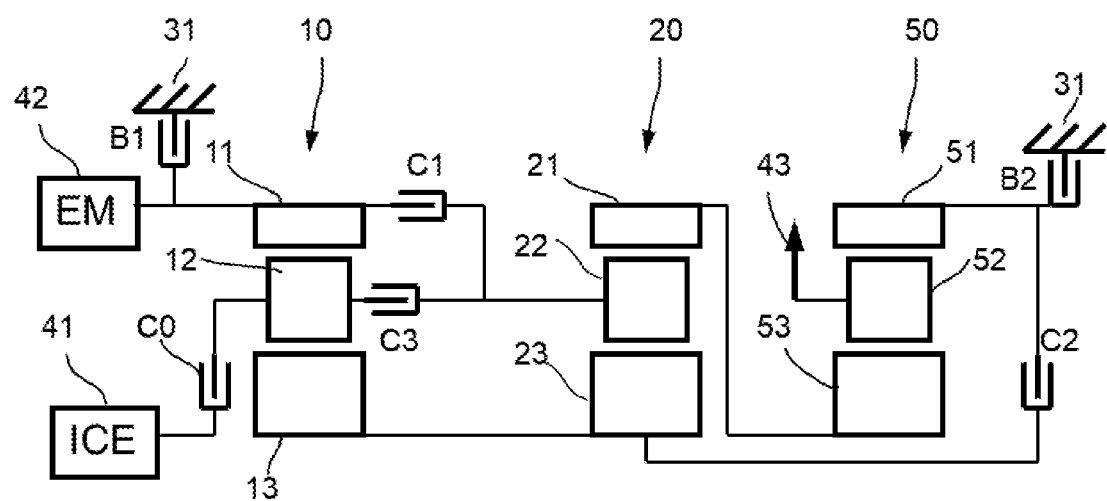
FIG. 6 is a schematic diagram of a sixth embodiment of the invented plug-in hybrid powertrain system with three planetary gear sets.

FIG. 6 shows a sixth embodiment of the plug-in hybrid powertrain system which includes an internal combustion engine 41, an electric machine 42 and an output shaft 43. The power transfer system of this plug-in hybrid powertrain system consists of three planetary gear sets. The first planetary gear set 10 is a simple planetary gear set, and has three elements labeled 11, 12 and 13. The second planetary gear set 20 is a simple planetary gear set, and has three elements labeled 21, 22 and 23. The third planetary gear set 50 is a simple planetary gear set, and has three elements labeled 51, 52 and 53. Elements 13 and 23 are connected with a fixed connection, and elements 21 and 53 are connected with another fixed connection, therefore there are total of two fixed connections deployed between neighboring planetary gear sets. The clutch C1 establishes a clutch connection between the element 11 and element 22. The clutch C2 establishes a clutch connection between element 23 and element 51. The clutch C3 establishes a clutch connection between element 12 and element 22. The clutch B1 establishes a clutch connection between element 11 and ground 31. The clutch B2 establishes a clutch connection between element 51 and ground 31. The clutch C0 establishes a clutch connection between element 12 and the internal combustion engine 41. The electric machine 42 is coupled with element 11, therefore the electric machine 42 is coupled with element 11 as well as with the grounding clutch B1 and connection clutch C1. The element 52 is coupled with the output shaft 43. The operation modes and vehicle operation methods of this embodiment are as same as what are described for the first embodiment of FIG. 1, except that this embodiment has more transfer ratio for both electric machine propulsion and internal combustion engine propulsion, and capable to do generator assistant (GA) launch for both forward and reverse. The states of the clutches C0, C1, C2, C3, B1 and B2 for all operation modes of this embodiment are summarized in the table shown in FIG. 18.

Figure 7:
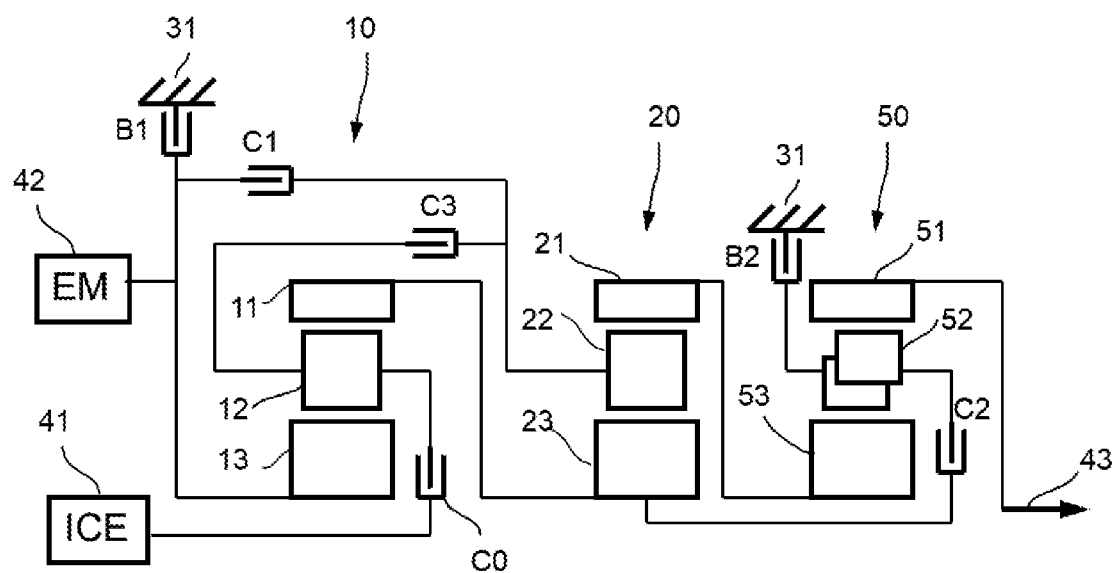
FIG. 7 is a schematic diagram of a seventh embodiment of the invented plug-in hybrid powertrain system with three planetary gear sets.

FIG. 7 shows a seventh embodiment of the plug-in hybrid powertrain system which includes an internal combustion engine 41, an electric machine 42 and an output shaft 43. The power transfer system of this plug-in hybrid powertrain system consists of three planetary gear sets. The first planetary gear set 10 is a simple planetary gear set, and has three elements labeled 11, 12 and 13. The second planetary gear set 20 is a simple planetary gear set, and has three elements labeled 21, 22 and 23. The third planetary gear set 50 is a compound (double-pinion gear) planetary gear set, and has three elements labeled 51, 52 and 53. Elements 11 and 23 are connected with a fixed connection, and elements 21 and 53 are connected with another fixed connection, therefore there are total of two fixed connections deployed between neighboring planetary gear sets. The clutch C1 establishes a clutch connection between the element 13 and element 22. The clutch C2 establishes a clutch connection between element 23 and element 52. The clutch C3 establishes a clutch connection between element 12 and element 22. The clutch B1 establishes a clutch connection between element 13 and ground 31. The clutch B2 establishes a clutch connection between element 52 and ground 31. The clutch C0 establishes a clutch connection between element 12 and the internal combustion engine 41. The electric machine 42 is coupled with element 13, therefore the electric machine 42 is coupled with element 13 as well as with the grounding clutch B1 and connection clutch C1. The element 51 is coupled with the output shaft 43. The operation modes and vehicle operation methods of this embodiment are as same as what are described for the first embodiment of FIG. 1, except that this embodiment has more transfer ratio for both electric machine propulsion and internal combustion engine propulsion, and capable to do generator assistant (GA) launch for both forward and reverse. The states of the clutches C0, C1, C2, C3, B1 and B2 for all operation modes of this embodiment are summarized in the table shown in FIG. 18.

Figure 8:
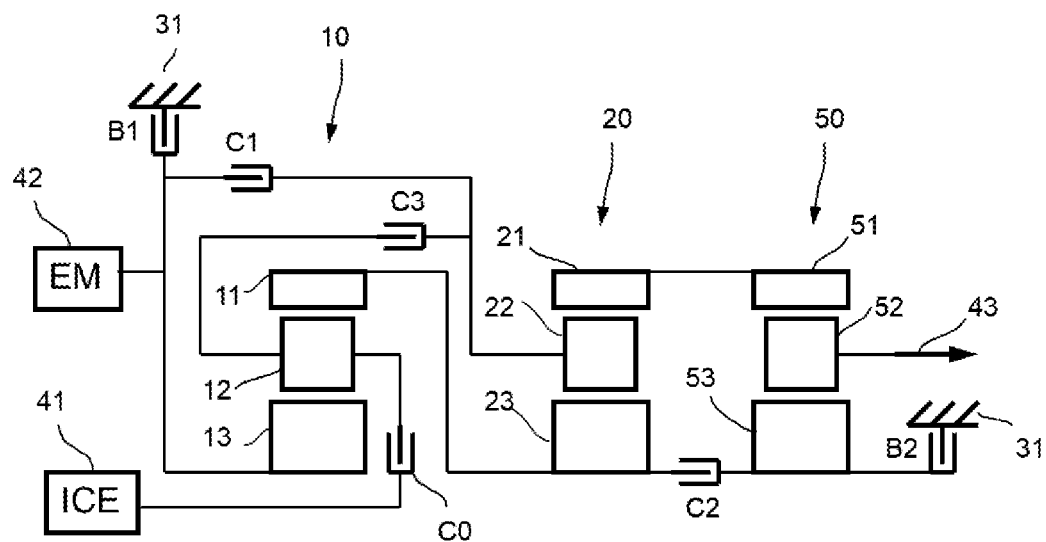
FIG. 8 is a schematic diagram of an eighth embodiment of the invented plug-in hybrid powertrain system with three planetary gear sets.

FIG. 8 shows an eighth embodiment of the plug-in hybrid powertrain system which includes an internal combustion engine 41, an electric machine 42 and an output shaft 43. The power transfer system of this plug-in hybrid powertrain system consists of three planetary gear sets. The first planetary gear set 10 is a simple planetary gear set, and has three elements labeled 11, 12 and 13. The second planetary gear set 20 is a simple planetary gear set, and has three elements labeled 21, 22 and 23. The third planetary gear set 50 is a simple planetary gear set, and has three elements labeled 51, 52 and 53. Elements 11 and 23 are connected with a fixed connection, and elements 21 and 51 are connected with another fixed connection, therefore there are total of two fixed connections deployed between neighboring planetary gear sets. The clutch C1 establishes a clutch connection between the element 13 and element 22. The clutch C2 establishes a clutch connection between element 23 and element 53. The clutch C3 establishes a clutch connection between element 12 and element 22. The clutch B1 establishes a clutch connection between element 13 and ground 31. The clutch B2 establishes a clutch connection between element 53 and ground 31. The clutch C0 establishes a clutch connection between element 12 and the internal combustion engine 41. The electric machine 42 is coupled with element 13, therefore the electric machine 42 is coupled with element 13 as well as with the grounding clutch B1 and connection clutch C1. The element 52 is coupled with the output shaft 43. The operation modes and vehicle operation methods of this embodiment are as same as what are described for the first embodiment of FIG. 1, except that this embodiment has more transfer ratio for both electric machine propulsion and internal combustion engine propulsion, and capable to do generator assistant (GA) launch for both forward and reverse. The states of the clutches C0, C1, C2, C3, B1 and B2 for all operation modes of this embodiment are summarized in the table shown in FIG. 18.

Figure 9:
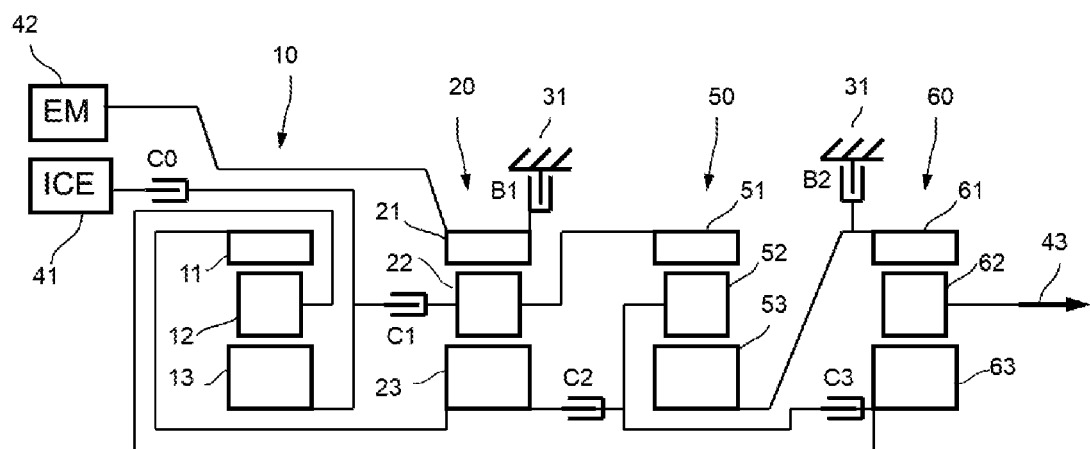
FIG. 9 is a schematic diagram of a ninth embodiment of the invented plug-in hybrid powertrain system with four planetary gear sets.

FIG. 9 shows a ninth embodiment of the plug-in hybrid powertrain system which includes an internal combustion engine 41, an electric machine 42 and an output shaft 43. The power transfer system of this plug-in hybrid powertrain system consists of four planetary gear sets. The first planetary gear set 10 is a simple planetary gear set, and has three elements labeled 11, 12 and 13. The second planetary gear set 20 is a simple planetary gear set, and has three elements labeled 21, 22 and 23. The third planetary gear set 50 is a simple planetary gear set, and has three elements labeled 51, 52 and 53. The forth planetary gear set 60 is a simple planetary gear set, and has three elements labeled 61, 62 and 63. Elements 11 and 23 are connected with a fixed connection, elements 22 and 51 are connected with another fixed connection, elements 53 and 61 are connected with another fixed connection, and elements 63 and 12 are connected with another fixed connection, therefore there are total of four fixed connections deployed between neighboring planetary gear sets. The clutch C1 establishes a clutch connection between the element 13 and element 22. The clutch C2 establishes a clutch connection between element 23 and element 52. The clutch C3 establishes a clutch connection between element 52 and element 63. The clutch B1 establishes a clutch connection between element 21 and ground 31. The clutch B2 establishes a clutch connection between element 61 and ground 31. The clutch C0 establishes a clutch connection between element 13 and the internal combustion engine 41. The electric machine 42 is coupled with element 21; therefore, the electric machine 42 is coupled with element 21 as well as with the grounding clutch B1. The element 62 is coupled with the output shaft 43. The operation modes and vehicle operation methods of this embodiment are as same as what are described for the first embodiment of FIG. 1, except that this embodiment has more transfer ratio for both electric machine propulsion and internal combustion engine propulsion, and capable to do generator assistant (GA) launch for both forward and reverse. The states of the clutches C0, C1, C2, C3, B1 and B2 for all operation modes of this embodiment are summarized in the table shown in FIG. 19.

Figure 10:
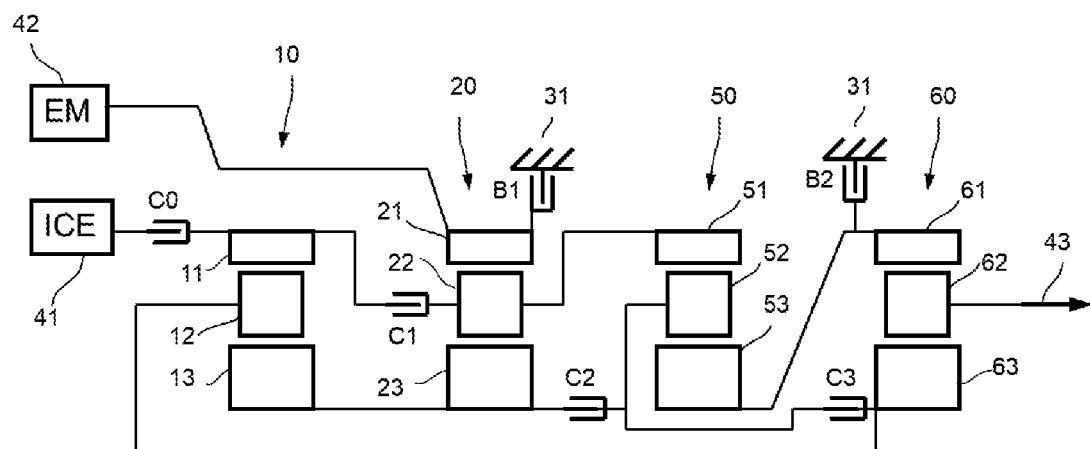
FIG. 10 is a schematic diagram of a tenth embodiment of the invented plug-in hybrid powertrain system with four planetary gear sets.

FIG. 10 shows a tenth embodiment of the plug-in hybrid powertrain system which includes an internal combustion engine 41, an electric machine 42 and an output shaft 43. The power transfer system of this plug-in hybrid powertrain system consists of four planetary gear sets. The first planetary gear set 10 is a simple planetary gear set, and has three elements labeled 11, 12 and 13. The second planetary gear set 20 is a simple planetary gear set, and has three elements labeled 21, 22 and 23. The third planetary gear set 50 is a simple planetary gear set, and has three elements labeled 51, 52 and 53. The forth planetary gear set 60 is a simple planetary gear set, and has three elements labeled 61, 62 and 63. Elements 13 and 23 are connected with a fixed connection, elements 22 and 51 are connected with another fixed connection, elements 53 and 61 are connected with another fixed connection, and elements 63 and 12 are connected with another fixed connection, therefore there are total of four fixed connections deployed between neighboring planetary gear sets. The clutch C1 establishes a clutch connection between the element 11 and element 22. The clutch C2 establishes a clutch connection between element 23 and element 52. The clutch C3 establishes a clutch connection between element 52 and element 63. The clutch B1 establishes a clutch connection between element 21 and ground 31. The clutch B2 establishes a clutch connection between element 61 and ground 31. The clutch C0 establishes a clutch connection between element 11 and the internal combustion engine 41. The electric machine 42 is coupled with element 21; therefore, the electric machine 42 is coupled with element 21 as well as with the grounding clutch B1. The element 62 is coupled with the output shaft 43. The operation modes and vehicle operation methods of this embodiment are as same as what are described for the first embodiment of FIG. 1, except that this embodiment has more transfer ratio for both electric machine propulsion and internal combustion engine propulsion, and capable to do generator assistant (GA) launch for both forward and reverse. The states of the clutches C0, C1, C2, C3, B1 and B2 for all operation modes of this embodiment are summarized in the table shown in FIG. 19.

Figure 11:
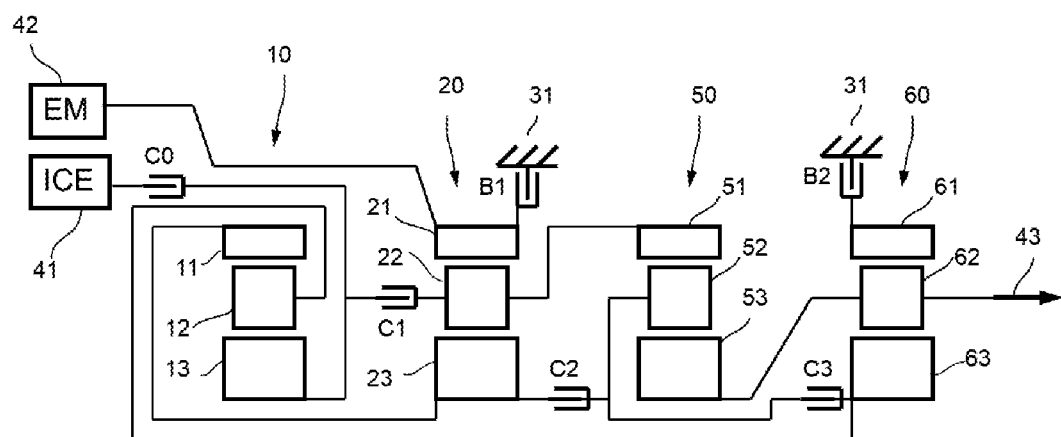
FIG. 11 is a schematic diagram of an eleventh embodiment of the invented plug-in hybrid powertrain system with four planetary gear sets.

FIG. 11 shows an eleventh embodiment of the plug-in hybrid powertrain system which includes an internal combustion engine 41, an electric machine 42 and an output shaft 43. The power transfer system of this plug-in hybrid powertrain system consists of four planetary gear sets. The first planetary gear set 10 is a simple planetary gear set, and has three elements labeled 11, 12 and 13. The second planetary gear set 20 is a simple planetary gear set, and has three elements labeled 21, 22 and 23. The third planetary gear set 50 is a simple planetary gear set, and has three elements labeled 51, 52 and 53. The forth planetary gear set 60 is a simple planetary gear set, and has three elements labeled 61, 62 and 63. Elements 11 and 23 are connected with a fixed connection, elements 22 and 51 are connected with another fixed connection, elements 53 and 62 are connected with another fixed connection, and elements 63 and 12 are connected with another fixed connection, therefore there are total of four fixed connections deployed between neighboring planetary gear sets. The clutch C1 establishes a clutch connection between the element 13 and element 22. The clutch C2 establishes a clutch connection between element 23 and element 52. The clutch C3 establishes a clutch connection between element 52 and element 63. The clutch B1 establishes a clutch connection between element 21 and ground 31. The clutch B2 establishes a clutch connection between element 61 and ground 31. The clutch C0 establishes a clutch connection between element 13 and the internal combustion engine 41. The electric machine 42 is coupled with element 21; therefore, the electric machine 42 is coupled with element 21 as well as with the grounding clutch B1. The element 62 is coupled with the output shaft 43 as well. The operation modes and vehicle operation methods of this embodiment are as same as what are described for the first embodiment of FIG. 1, except that this embodiment has more transfer ratio for both electric machine propulsion and internal combustion engine propulsion, and capable to do generator assistant (GA) launch for both forward and reverse. The states of the clutches C0, C1, C2, C3, B1 and B2 for all operation modes of this embodiment are summarized in the table shown in FIG. 19.

Figure 12:
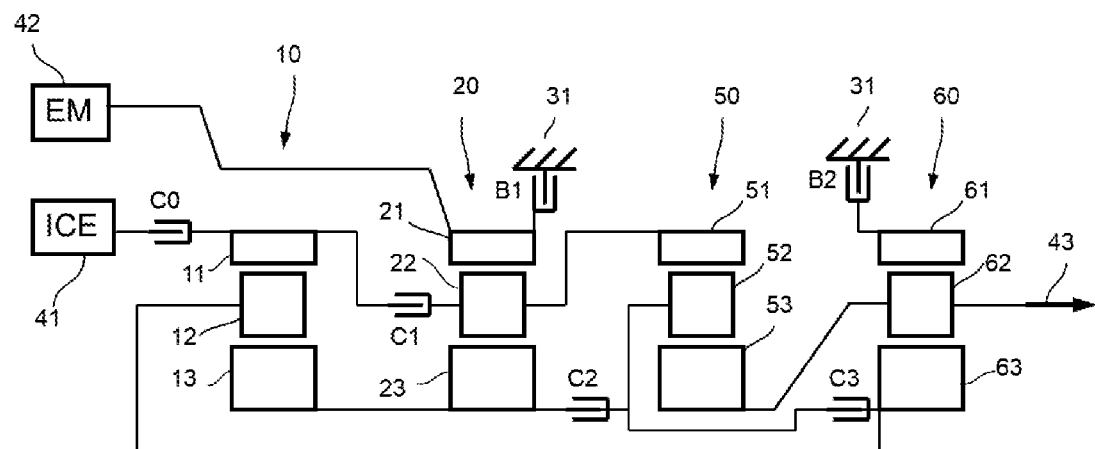
FIG. 12 is a schematic diagram of a twelfth embodiment of the invented plug-in hybrid powertrain system with four planetary gear sets.

FIG. 12 shows a twelfth embodiment of the plug-in hybrid powertrain system which includes an internal combustion engine 41, an electric machine 42 and an output shaft 43. The power transfer system of this plug-in hybrid powertrain system consists of four planetary gear sets. The first planetary gear set 10 is a simple planetary gear set, and has three elements labeled 11, 12 and 13. The second planetary gear set 20 is a simple planetary gear set, and has three elements labeled 21, 22 and 23. The third planetary gear set 50 is a simple planetary gear set, and has three elements labeled 51, 52 and 53. The forth planetary gear set 60 is a simple planetary gear set, and has three elements labeled 61, 62 and 63. Elements 13 and 23 are connected with a fixed connection, elements 22 and 51 are connected with another fixed connection, elements 53 and 62 are connected with another fixed connection, and elements 63 and 12 are connected with another fixed connection, therefore there are total of four fixed connections deployed between neighboring planetary gear sets. The clutch C1 establishes a clutch connection between the element 11 and element 22. The clutch C2 establishes a clutch connection between element 23 and element 52. The clutch C3 establishes a clutch connection between element 52 and element 63. The clutch B1 establishes a clutch connection between element 21 and ground 31. The clutch B2 establishes a clutch connection between element 61 and ground 31. The clutch C0 establishes a clutch connection between element 11 and the internal combustion engine 41. The electric machine 42 is coupled with element 21; therefore, the electric machine 42 is coupled with element 21 as well as with the grounding clutch B1. The element 62 is coupled with the output shaft 43. The operation modes and vehicle operation methods of this embodiment are as same as what are described for the first embodiment of FIG. 1, except that this embodiment has more transfer ratio for both electric machine propulsion and internal combustion engine propulsion, and capable to do generator assistant (GA) launch for both forward and reverse. The states of the clutches C0, C1, C2, C3, B1 and B2 for all operation modes of this embodiment are summarized in the table shown in FIG. 19.

Figure 13:
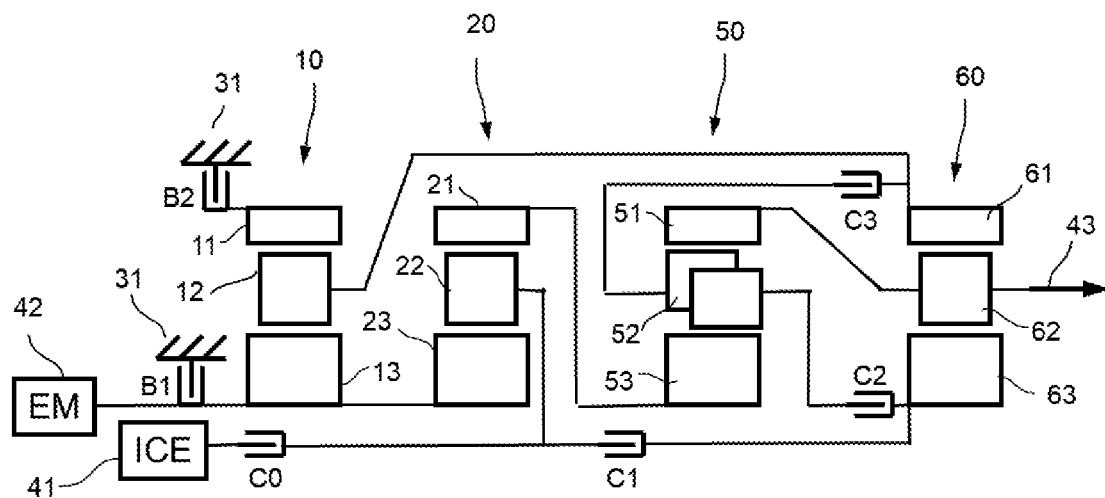
FIG. 13 is a schematic diagram of a thirteenth embodiment of the invented plug-in hybrid powertrain system with four planetary gear sets.

FIG. 13 shows a thirteenth embodiment of the plug-in hybrid powertrain system which includes an internal combustion engine 41, an electric machine 42 and an output shaft 43. The power transfer system of this plug-in hybrid powertrain system consists of four planetary gear sets. The first planetary gear set 10 is a simple planetary gear set, and has three elements labeled 11, 12 and 13. The second planetary gear set 20 is a simple planetary gear set, and has three elements labeled 21, 22 and 23. The third planetary gear set 50 is a compound (double-pinion gear) planetary gear set, and has three elements labeled 51, 52 and 53. The forth planetary gear set 60 is a simple planetary gear set, and has three elements labeled 61, 62 and 63. Elements 13 and 23 are connected with a fixed connection, elements 21 and 53 are connected with another fixed connection, elements 51 and 62 are connected with another fixed connection, and elements 61 and 12 are connected with another fixed connection, therefore there are total of four fixed connections deployed between neighboring planetary gear sets. The clutch C1 establishes a clutch connection between the element 22 and element 63. The clutch C2 establishes a clutch connection between element 52 and element 63. The clutch C3 establishes a clutch connection between element 52 and element 61. The clutch B1 establishes a clutch connection between element 13 and ground 31. The clutch B2 establishes a clutch connection between element 11 and ground 31. The clutch C0 establishes a clutch connection between element 22 and the internal combustion engine 41. The electric machine 42 is coupled with element 13; therefore, the electric machine 42 is coupled with element 13 as well as with the grounding clutch B1. The element 62 is coupled with the output shaft 43. The operation modes and vehicle operation methods of this embodiment are as same as what are described for the first embodiment of FIG. 1, except that this embodiment has more transfer ratio for both electric machine propulsion and internal combustion engine propulsion, and capable to do generator assistant (GA) launch for both forward and reverse. The states of the clutches C0, C1, C2, C3, B1 and B2 for all operation modes of this embodiment are summarized in the table shown in FIG. 20.

Figure 14:
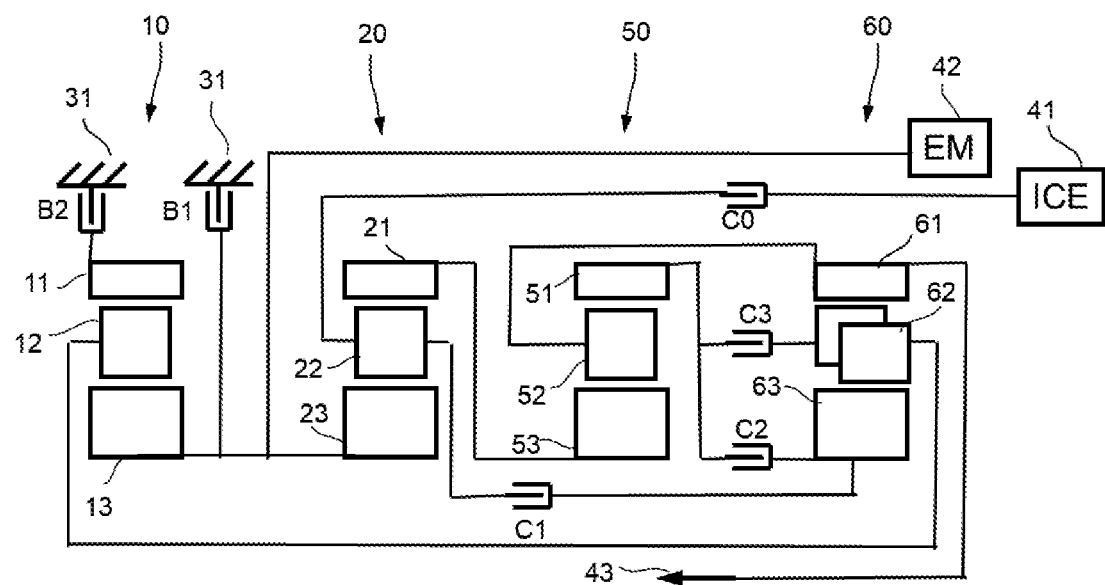
FIG. 14 is a schematic diagram of a fourteenth embodiment of the invented plug-in hybrid powertrain system with four planetary gear sets.

FIG. 14 shows a fourteenth embodiment of the plug-in hybrid powertrain system which includes an internal combustion engine 41, an electric machine 42 and an output shaft 43. The power transfer system of this plug-in hybrid powertrain system consists of four planetary gear sets. The first planetary gear set 10 is a simple planetary gear set, and has three elements labeled 11, 12 and 13. The second planetary gear set 20 is a simple planetary gear set, and has three elements labeled 21, 22 and 23. The third planetary gear set 50 is a simple planetary gear set, and has three elements labeled 51, 52 and 53. The forth planetary gear set 60 is a compound (double-pinion gear) planetary gear set, and has three elements labeled 61, 62 and 63. Elements 13 and 23 are connected with a fixed connection, elements 21 and 53 are connected with another fixed connection, elements 52 and 61 are connected with another fixed connection, and elements 62 and 12 are connected with another fixed connection, therefore there are total of four fixed connections deployed between neighboring planetary gear sets. The clutch C1 establishes a clutch connection between the element 22 and element 63. The clutch C2 establishes a clutch connection between element 51 and element 63. The clutch C3 establishes a clutch connection between element 51 and element 62. The clutch B1 establishes a clutch connection between element 13 and ground 31. The clutch B2 establishes a clutch connection between element 11 and ground 31. The clutch C0 establishes a clutch connection between element 22 and the internal combustion engine 41. The electric machine 42 is coupled with element 13; therefore, the electric machine 42 is coupled with element 13 as well as with the grounding clutch B1. The element 61 is coupled with the output shaft 43. The operation modes and vehicle operation methods of this embodiment are as same as what are described for the first embodiment of FIG. 1, except that this embodiment has more transfer ratio for both electric machine propulsion and internal combustion engine propulsion, and capable to do generator assistant (GA) launch for both forward and reverse. The states of the clutches C0, C1, C2, C3, B1 and B2 for all operation modes of this embodiment are summarized in the table shown in FIG. 20.

Figure 15:
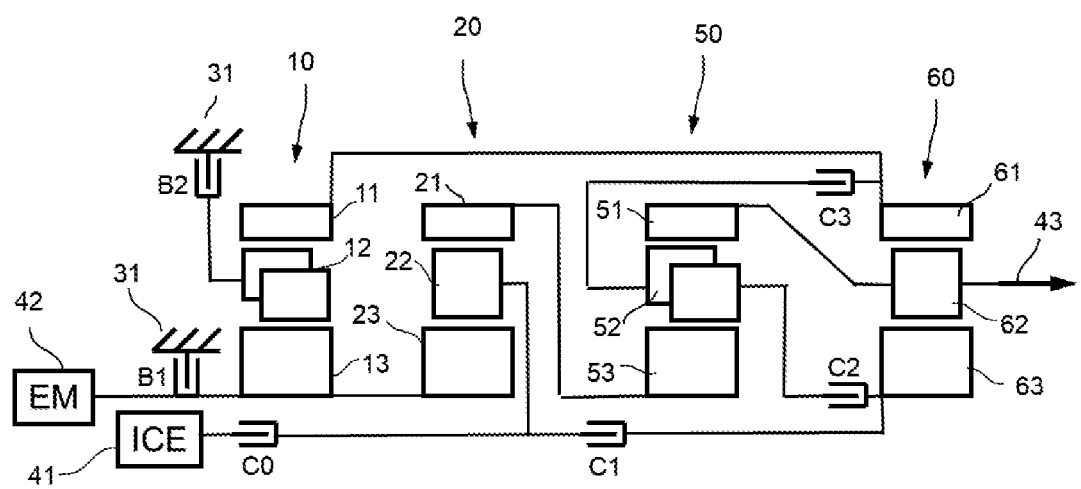
FIG. 15 is a schematic diagram of a fifteenth embodiment of the invented plug-in hybrid powertrain system with four planetary gear sets.

FIG. 15 shows a fifteenth embodiment of the plug-in hybrid powertrain system which includes an internal combustion engine 41, an electric machine 42 and an output shaft 43. The power transfer system of this plug-in hybrid powertrain system consists of four planetary gear sets. The first planetary gear set 10 is a compound (double-pinion gear) planetary gear set, and has three elements labeled 11, 12 and 13. The second planetary gear set 20 is a simple planetary gear set, and has three elements labeled 21, 22 and 23. The third planetary gear set 50 is a compound (double-pinion gear) planetary gear set, and has three elements labeled 51, 52 and 53. The forth planetary gear set 60 is a simple planetary gear set, and has three elements labeled 61, 62 and 63. Elements 13 and 23 are connected with a fixed connection, elements 21 and 53 are connected with another fixed connection, elements 51 and 62 are connected with another fixed connection, and elements 61 and 11 are connected with another fixed connection, therefore there are total of four fixed connections deployed between neighboring planetary gear sets. The clutch C1 establishes a clutch connection between the element 22 and element 63. The clutch C2 establishes a clutch connection between element 52 and element 63. The clutch C3 establishes a clutch connection between element 52 and element 61. The clutch B1 establishes a clutch connection between element 13 and ground 31. The clutch B2 establishes a clutch connection between element 12 and ground 31. The clutch C0 establishes a clutch connection between element 22 and the internal combustion engine 41. The electric machine 42 is coupled with element 13; therefore, the electric machine 42 is coupled with element 13 as well as with the grounding clutch B1. The element 62 is coupled with the output shaft 43. The operation modes and vehicle operation methods of this embodiment are as same as what are described for the first embodiment of FIG. 1, except that this embodiment has more transfer ratio for both electric machine propulsion and internal combustion engine propulsion, and capable to do generator assistant (GA) launch for both forward and reverse. The states of the clutches C0, C1, C2, C3, B1 and B2 for all operation modes of this embodiment are summarized in the table shown in FIG. 20.

Figure 16:
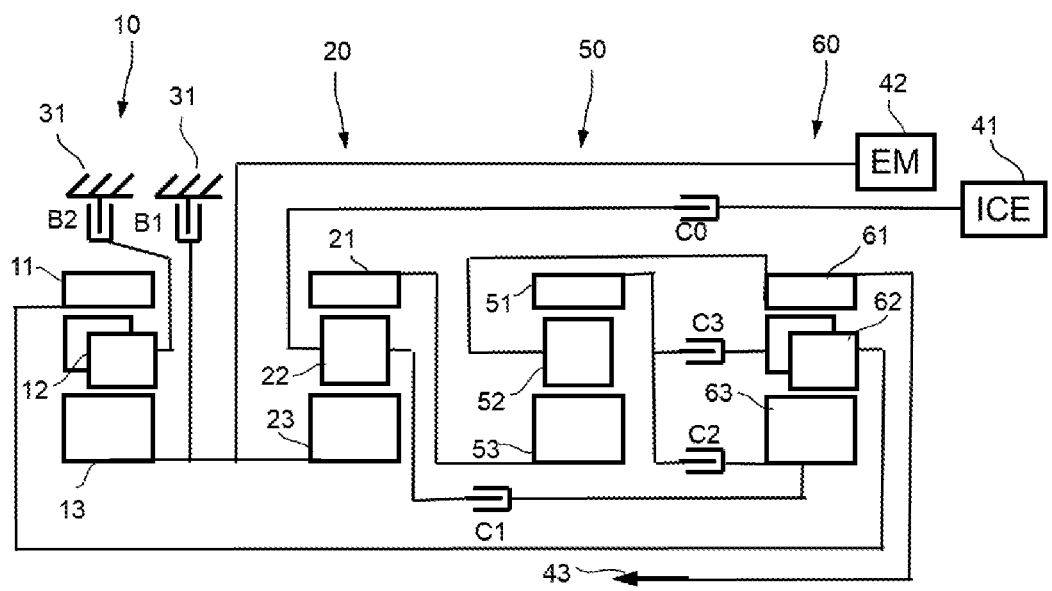
FIG. 16 is a schematic diagram of a sixteenth embodiment of the invented plug-in hybrid powertrain system with four planetary gear sets.

FIG. 16 shows a sixteenth embodiment of the plug-in hybrid powertrain system which includes an internal combustion engine 41, an electric machine 42 and an output shaft 43. The power transfer system of this plug-in hybrid powertrain system consists of four planetary gear sets. The first planetary gear set 10 is a compound (double-pinion gear) planetary gear set, and has three elements labeled 11, 12 and 13. The second planetary gear set 20 is a simple planetary gear set, and has three elements labeled 21, 22 and 23. The third planetary gear set 50 is a simple planetary gear set, and has three elements labeled 51, 52 and 53. The forth planetary gear set 60 is a compound (double-pinion gear) planetary gear set, and has three elements labeled 61, 62 and 63. Elements 13 and 23 are connected with a fixed connection, elements 21 and 53 are connected with another fixed connection, elements 52 and 61 are connected with another fixed connection, and elements 62 and 11 are connected with another fixed connection, therefore there are total of four fixed connections deployed between neighboring planetary gear sets. The clutch C1 establishes a clutch connection between the element 22 and element 63. The clutch C2 establishes a clutch connection between element 51 and element 63. The clutch C3 establishes a clutch connection between element 51 and element 62. The clutch B1 establishes a clutch connection between element 13 and ground 31. The clutch B2 establishes a clutch connection between element 12 and ground 31. The clutch C0 establishes a clutch connection between element 22 and the internal combustion engine 41. The electric machine 42 is coupled with element 13; therefore, the electric machine 42 is coupled with element 13 as well as with the grounding clutch B1. The element 61 is coupled with the output shaft 43. The operation modes and vehicle operation methods of this embodiment are as same as what are described for the first embodiment of FIG. 1, except that this embodiment has more transfer ratio for both electric machine propulsion and internal combustion engine propulsion, and capable to do generator assistant (GA) launch for both forward and reverse. The states of the clutches C0, C1, C2, C3, B1 and B2 for all operation modes of this embodiment are summarized in the table shown in FIG. 20.

The invention claimed is:

1. A plug-in hybrid powertrain comprising:
first, second and third planetary gearsets each having first element, second element and third element six clutches; an internal combustion engine; an electrical machine; an output member; a ground member;
by selectively engaging the clutches, the plug-in hybrid powertrain provides seven torque transfer ratios from the internal combustion engine to the output member, four torque transfer ratios from the electrical machine to the output member, generator assisted launch modes for forward and reverse in internal combustion engine power only vehicle launch operations and an engine cranking mode;
the first planetary gearset has the following connections: the first element of the first planetary gearset has a fixed connection with the third element of the second planetary gearset the second element of the first planetary gearset has a clutch connection with the second element of the second planetary gearset and another clutch connection with the internal combustion engine; and the third element of the first planetary gearset has a fixed connection with the electrical machine, a clutch connection with the ground element, and another clutch connection with the second element of the second planetary gearset;
the second planetary gearset has the following connections: the first element of the second planetary gearset has a fixed connection with the third element of the third planetary gearset the second element of the second planetary gearset has two clutch connections with the second and the third elements of the first planetary gearset respectively; and the third element of the second planetary gearset has a fixed connection with the first element of the first planetary gearset and a clutch connection with the second element of the third planetary gearset;
the third planetary gearset has the following connections: the first element of the third planetary gearset has a fixed connection with the output member; the second element of the third planetary gearset has a clutch connection with the third element of the second planetary gearset and another clutch connection with the ground element the third element of the third planetary gearset has a fixed connection with the first element of the second planetary gearset.

* * * * *